(12) United States Patent
Moniruzzaman et al.

(10) Patent No.: US 8,816,042 B2
(45) Date of Patent: Aug. 26, 2014

(54) POLYAMIDE COMPOSITES HAVING FLEXIBLE SPACERS

(75) Inventors: Mohammad Moniruzzaman, Philadelphia, PA (US); Karen I. Winey, Philadelphia, PA (US); Jayanta Chattopadhyay, Houston, TX (US); W. Edward Billups, Houston, TX (US)

(73) Assignees: The Trustees Of The University Of Pennsylvania, Philadelphia, PA (US); William Marsh Rice University, Houston, TX (US)

( * ) Notice: Subject to any disclaimer, the term of this patent is extended or adjusted under 35 U.S.C. 154(b) by 1207 days.

(21) Appl. No.: 12/665,121

(22) PCT Filed: Jun. 27, 2008

(86) PCT No.: PCT/US2008/068533
§ 371 (c)(1),
(2), (4) Date: Aug. 5, 2010

(87) PCT Pub. No.: WO2009/014857
PCT Pub. Date: Jan. 29, 2009

(65) Prior Publication Data
US 2013/0190472 A1    Jul. 25, 2013

Related U.S. Application Data

(60) Provisional application No. 60/946,770, filed on Jun. 28, 2007.

(51) Int. Cl.
*C08G 69/26* (2006.01)
*C08L 77/06* (2006.01)

(52) U.S. Cl.
USPC .......................................................... 528/339

(58) Field of Classification Search
CPC ..................... C08G 69/26–69/30; C08L 77/06
USPC .................................................. 528/332–340
See application file for complete search history.

(56) References Cited

U.S. PATENT DOCUMENTS

| | | | |
|---|---|---|---|
| 6,426,134 | B1 | 7/2002 | Lavin et al. |
| 6,812,325 | B2 | 11/2004 | Higley |
| 7,148,269 | B2 | 12/2006 | Winey et al. |
| 2006/0155043 | A1 | 7/2006 | Johnson et al. |
| 2006/0270790 | A1 | 11/2006 | Comeau |
| 2007/0118937 | A1 | 5/2007 | Hwang et al. |

FOREIGN PATENT DOCUMENTS

| | | |
|---|---|---|
| WO | WO 2005/090233 A2 | 9/2005 |
| WO | WO 2009/014857 A1 | 1/2009 |

OTHER PUBLICATIONS

Peng et al (Sidewall Carboxylic Acid Functionalization of Single-Walled Carbon Nanotubes, J. Am. Chem. Soc. 2003, 125, 15174-15182).*

Ajayan et al., "Aligned Carbon Nanotube Arrays Formed by Cutting a Polymer Resin-Nanotube Composite", Science, Aug. 26, 1994, 265(5176), 1212-1214.

(Continued)

*Primary Examiner* — Randy Gulakowski
*Assistant Examiner* — Rachel Kahn
(74) *Attorney, Agent, or Firm* — Baker & Hostetler LLP

(57) ABSTRACT

Provided are polyamide nanocomposites incorporating carbon nanotubes and other filler species. Also provided are related methods.

29 Claims, 10 Drawing Sheets

Scheme 2. Synthesis of fSWNT/nylon 6,10 composites

(56) References Cited

OTHER PUBLICATIONS

Bronikowski et al., "Gas-Phase Production of Carbon Single-Walled Nanotubes From Carbon Monoxide Via the HiPco Process: A Parametric Study", J. Vac. Sci. Technol. A, Jul. 2001, 19(4), 1800-1805.

Chiang et al., "Purification and Characterization of Single-Wall Carbon Nanotubes (SWNTs) Obtained From the Gas-Phase Decomposition of CO (HiPco Process)", J. Phys. Chem. B., Aug. 10, 2001, 105(35), 8297-8301.

Coleman et al., "Mechanical Reinforcement of Polymers Using Carbon Nanotubes", Adv. Mater., Feb. 22, 2006, 18(6), 689-706.

Du et al., "Effect of Nanotube Alignment on Percolation Conductivity in Carbon Nanotube/Polymer Composites", Phys. Rev. B: Condens. Matter, Sep. 19, 2005, 72(12), 121404/1-121404/4.

Dyke et al., "Overcoming the Insolubility of Carbon Nanotubes Through High Degrees of Sidewall Functionalization", Chem. Eur. J., Feb. 16, 2004, 10(4), 812-817.

Dyke et al., "Convalent Functionalization of Single-Walled Carbon Nanotubes for Materials Applications", J. Phys. Chem. A, Nov. 26, 2004, 108(51), 11151-11159.

Frankland et al., "Molecular Simulation of the Influence of Chemical Cross-Links on the Shear Strength of Carbon-Nanotube-Polymer Interfaces", J. Phys. Chem., B, Mar. 3, 2002, 106(12), 3046-3048.

Gao et al., "Chemical Engineering of the Single-Walled Carbon Nanotube-Nylon 6 Interface", J. Am. Chem Soc., May 19, 2006, 128(23), 7492-7496.

Gao et al., "Continuous Spinning of a Single-Walled Carbon Nanotube-Nylon Composite Fiber", J. Am. Chem. Soc., Feb. 22, 2005, 127(11), 3847-3854.

Haggenmueller et al., "Single Wall Carbon Nanotube/Polyethylene Nanocomposite: Nucleating and Templating Polyethylene Crystallites", Macromolecules, Mar. 10, 2006, 39(8), 2964-2971.

Haggenmueller et al., "Interfacial in Situ Polymerization of a Single Wall Carbon Nanotbue/Nylon 6,6 Nanocomposites", Polymer, Feb. 20, 2006, 47(7), 2381-2388.

Islam et al., "High-Weight Fraction Surfactant Solubilization of Single-Wall Carbon Nanotubes in Water", Nano Lett, Jan. 16, 2003, 3(2), 269-273.

Jia et al., "Study on Nylon-6/Carbon Nanotube Composites", New Carbon Materials /Xinxing Tan Cailiao, 1999, 14, 32-36 (Chinese Document With English Abstract).

Jia et al., "Fabrication of Carbon Nanotubes/Nylon-6 Composites by in situ process", Qinghua Daxue Xuebao, Ziran Kexueban (Journal of Tsinghua University Science & Technology), 2000, 40(4), 14-16 (Chinese Document With English Abstract).

Kang et al., "Nylon 610 and Carbon Nanotube Composite by in situ Interfacial Polymerization", Polymer, May 17, 2006, 47(11), 3961-3966.

Liang et al., "A Convenient Route to Functionalized Carbon Nanotubes", Nano Lett., Jun. 3, 2004, 4(7), 1257-1260.

Liu, "Morphology and Mechanical Properties of Multiwalled Carbon Nanotubes Reinforced Nylon-6 Composites", Macromolecules, Sep. 2004, 37(19), 7214-7222.

Miyagawa et al., "Mechanical Properties of Carbon Nanotubes and Their Polymer Nanocomposites", J. Nanosci. Nanotechnol., Oct. 2005, 5(10), 1593-1615.

Moniruzzaman et al., "Polymer Nanocomposites Containing Carbon Nanotubes", Macromolecules, Jul. 7, 2006, 39(16), 5194-5205.

Morgan et al., "Interfacial Polycondensation. XIII. Viscosity-Molecular Weight Relationship and Some Molecular Characteristics of 6-10 Polyamide", J. Polym. Sci. A,Mar. 10, 1963, 1(4), 1147-1162.

Niyogi et al., "Ultrasonic Dispersions of Single-Walled Carbon Nanotubes", J. Phys. Chem. B., Aug. 2, 2003, 107(34), 8799-8804.

Star et al., "Preparation and Properties of Polymer-Wrapped Single-Walled Carbon Nanotubes", Angew. Chem., Int. Ed., May 4, 2001, 40(9), 1721-1725.

Sun et al., "Functionalized Carbon Nanotubes: Properties and Applications", Acc. Chem. Res, Nov. 23, 2002, 35(12), 1096-1104.

Xia et al., "Polymer-Encapsulated Carbon Nanotubes Prepared Through Ultrasonically Initiated In Situ Emulsion Polymerization", Chem. Mater., Sep. 5, 2003, 15(20), 3879-3886.

Zhang et al., "Carbon Nanotubes Reinforced Nylon-6 Composite Prepared by Simple Melt-Compounding", Macromolecules, Jan. 2004, 37(2), 256-259.

Zheng et al., "In Situ Polymerization Approach to Multiwalled Carbon Nanotubes-Reinforced Nylon 1010 Composites: Mechanical Properties and Crystallization Behavior", Polymer, Jan. 3, 2006, 47(1), 113-122.

* cited by examiner

Scheme 1. Functionalization of SWNT with alkyl acid chloride group

Scheme 2. Synthesis of fSWNT/nylon 6,10 composites

Scheme 3. Reaction between hexamethylene diamine and C9-SWNT

POLYAMIDE COMPOSITES HAVING FLEXIBLE SPACERS

CROSS-REFERENCE TO RELATED APPLICATIONS

This application is the National Stage of International Application No. PCT/US2008/068533, filed Jun. 27, 2008, which claims the benefit of U.S. Provisional Application No. 60/946,770, filed Jun. 28, 2007, the disclosures of which are incorporated herein by reference in their entireties for all purposes.

STATEMENT OF GOVERNMENT RIGHTS

The United States government may have certain rights in this invention. This invention was funded by the National Science Foundation (DMRMRSEC 05-20020, CHE-0450085), and the Office of Naval Research (DURINT N00014-00-1-0720).

FIELD OF THE INVENTION

The present invention pertains to the field of carbon nanotubes. The present invention also pertains to the fields of polyamide polymers and composite materials.

BACKGROUND OF THE INVENTION

Various scientific and patent publications are referred to herein. Each is incorporated by reference in its entirety.

The high aspect ratio, low mass density and outstanding mechanical, electrical, and thermal properties of individual single wall carbon nanotubes (SWNT) and multiwall carbon nanotubes (MWNT) make them candidates for inclusion in polymer composite materials. Since the first report of polymer composites incorporating nanotubes, several attempts have been made to overcome certain challenges, e.g., poor dispersion of nanotubes in solvents and polymer matrices, limited load transfer from the matrix to the nanotubes inherent in the synthesis of the composites.

Among polyamides, Nylon 6 and Nylon 6,10 are commercially important thermoplastics. Although polyamides, including Nylon 6 and Nylon 6, 10 are versatile materials having attractive characteristics, it is desirable to enhance the mechanical properties of polyamides.

Accordingly, there is a need in the art for improved polyamide materials having enhanced mechanical properties over standard polyamides. There is also an attendant need for methods to make such improved polyamide materials.

SUMMARY OF THE INVENTION

In meeting the needs previously described, disclosed are composite polyamide materials, comprising: at least one polyamide having the molecular formula: [—NH—$(CH_2)_a$—NH—CO—$(CH_2)_b$—CO—]; and at least one filler species-polyamide having the molecular formula: [—NH—$(CH_2)_a$—NH—CO—$(CH_2)_n$-filler species-$(CH_2)_n$—CO—], a peptide bond binding together the at least one polyamide and the at least one filler species-polyamide.

Also disclosed are methods for synthesizing a composite polyamide material, comprising: dispersing at least one filler species and at least one diacid halide into an organic medium, the at least one filler species comprising at least one alkyl chain bound to the at least one filler species, and the at least one alkyl chain terminating with an acid chloride; dispersing at least one diamine in an aqueous medium; and contacting the organic medium and the aqueous medium so as to give rise to at least one diamine undergoing a condensation reaction with at least one acid chloride group of at least one filler species, and so as to give rise to at least one diamine capable of undergoing a condensation reaction with at least one diacid halide, at least one diamine undergoing condensation reactions with at least one acid chloride group of at least one filler species and with at least one diacid halide.

Further provided are composite polyamide materials, comprising: at least one polyamide having the molecular formula [—NH—$(CH_2)_5$—CO—]$_y$; and at least one filler species-polyamide having the molecular formula [—NH—$(CH_2)_5$—CO—NH—CO—$(CH_2)_n$-filler species-$(CH_2)_n$—CO—], at least one peptide bond binding together the at least one polyamide and the at least one filler species-polyamide.

Also disclosed are methods for synthesizing a composite polyamide material, comprising: polymerizing a monomer in the presence of at least one filler species, the at least one filler species comprising at least one alkyl chain bound to the at least one filler species, the at least one alkyl chain terminating with a reactive end group, the monomer forming at least one polymer chain, and the at least one filler species undergoing a condensation reaction with the polymer chain.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
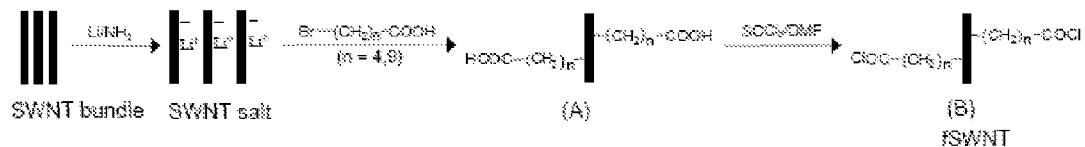
FIG. 1 depicts reaction Scheme 1, for functionalizing a single-wall carbon nanotube with an alkyl chloride.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In a first aspect, the present invention discloses composite polyamide materials. Such materials include at least one polyamide having the molecular formula: [—NH—$(CH_2)_a$—NH—CO—$(CH_2)_b$—CO—] and at least one filler species-polyamide having the molecular formula [—NH—$(CH_2)_a$—NH—CO—$(CH_2)_n$-filler species-$(CH_2)_n$—CO—], a peptide bond binding together the at least one polyamide and the at least one filler species-polyamide.

Typically, a is an integer in the range of from about 4 to about 10, and is preferably equal to 6. Suitably, b is an integer in the range of from about 4 to about 10, or in the range of from about 4 to about 8. In one non-limiting example, using Nylon 6,10, a has a value of 6 and b has a value of 8.

In typical configurations, n, the number of methylene units in the alkyl spacer chain attached to the filler species, is an integer in the range of from about 1 to about 20, or in the range of from about 2 to about 12, or in the range of from about 4 to about 9. The number of methylene units in a given alkyl spacer chain can vary depending on the desired mechanical properties of the composite material; as described elsewhere herein, composite materials incorporating alkyl chains having n=4 had a higher Young's modulus than did composite chains incorporating alkyl chains having 9 methylene units.

Suitable filler species include single-wall carbon nanotubes, double-wall carbon nanotubes, multiwall carbon nanotubes, and combinations. Single-wall carbon nanotubes are considered especially suitable—they are readily available, and techniques for adapting single-wall carbon nanotubes to include alkyl chains terminating with reactive groups are known to those having ordinary skill in the art. Other suitable filler species include carbon nanofibers, graphite, graphene, carbon fibers, and combinations thereof. The optimum filler species for a given composite material will depend on the needs of the user.

It is expected that the composite polyamide material of the present invention exhibits a Young's modulus in the range of from about 50% to about 500% of the Young's modulus of the at least one polyamide, or in the range of from about 100% to about 400% the Young's modulus of the at least one polyamide, or in the range of from about 150% to about 250% the Young's modulus of the at least one polyamide. It is believed that, at all events, incorporation of the described filler species into the polyamides results in certain enhanced mechanical properties, and without being bound to any one theory of operation, it is believed that the alkyl spacer arms bound to the filler species of the present materials assume portions of any mechanical load applied to the materials and contribute their superior mechanical properties to the bulk material.

Composite polyamide materials of the present invention typically exhibit a tensile strength in the range of from about 50% to about 500% of the tensile strength of the at least one polyamide. Some of the inventive materials exhibit a tensile strength in the range of from about 100% to about 400% of the tensile strength of the at least one polyamide, or even in the range of from about 150% to about 250% of the tensile strength of the at least one polyamide. The composite materials of the present invention typically have a toughness of from about 50% to about 500% of the toughness of non-composite polyamides.

Figure 2:
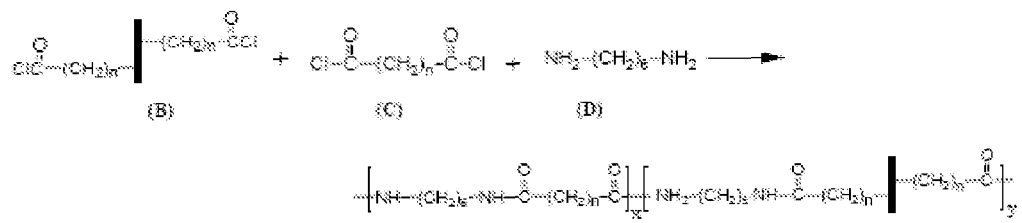
FIG. 2 depicts reaction Scheme 2, for the synthesis of functionalized single-wall carbon nanotubes ("fSWNT")/Nylon 6/10 composite materials.

Also disclosed are methods for synthesizing composite polyamide materials, which methods are illustrated in Scheme 2 of FIG. 2. These methods include dispersing at least one filler species and at least one diacid halide into an organic medium, the at least one filler species comprising at least one alkyl chain bound to the at least one filler species, and the at least one alkyl chain terminating with an acid chloride.

Figure 5:
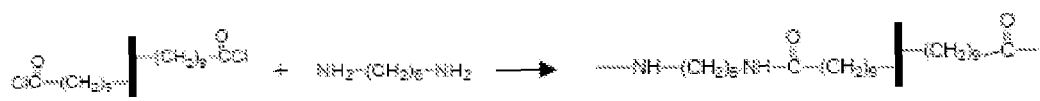
FIG. 5 depicts reaction Scheme 3, for reacting hexamethylene diamine and a single wall carbon nanotube ("C9-SWNT") bearing 9-carbon alkyl chains terminated by acid chlorides.

At least one diamine is then dispersed in an aqueous medium; and the organic medium and the aqueous medium are contacted so as to give rise to at least one diamine undergoing a condensation reaction with at least one acid chloride group of at least one filler species as shown in Scheme 3 of FIG. 5, and so as to give rise to at least one diamine capable of undergoing a condensation reaction with at least one diacid halide, at least one diamine undergoing condensation reactions with at least one acid chloride group of at least one filler species and with at least one diacid halide.

Suitable filler species are described elsewhere herein. The concentration of alkyl chains bound to the filler species may be varied.

Suitable acid dihalides have structures of Cl—CO—$(CH_2)_n$—CO—Cl, in which structures n is an integer in the range of from about 4 to about 10. Sebacoyl chloride is considered an especially suitable acid dihalide—it is readily available and its use in Nylon 6,10 synthesis is well-known.

Typically, the organic medium of the disclosed methods essentially homogeneously disperses the at least one functionalized single-wall carbon nanotube and the at least one diacid halide. Such homogeneous dispersion ensures that the maximum number of molecules are available for the synthesis reaction.

Dichlorobenzene is considered a suitable organic medium. Toluene may also be used as an organic medium; other suitable organic media will be apparent to those having ordinary skill in the art.

Diamines suitable for use in the present invention typically have structures of $H_2N-(CH_2)_n-NH_2$, wherein n comprises an integer in the range of from about 2 to about 12. A suitable diamine is 1,6 hexamethylene diamine. Aqueous media suitable for dispersing the diamines include water, and, in some embodiments, can include a base.

Typically, the at least one diacid halide and the at least one diamine are present in approximately equimolar amounts, although the at least one diamine can also be present in an about 10% molar excess over the at least one diacid halide.

The at least one filler species is typically present in the range of from about 0.1 weight percent of the total weight of the at least one filler species, the at least one diacid halide, and the at least one diamine to about 10 weight percent of the total weight of the at least one functionalized filler species, the at least one diacid halide, and the at least one diamine, although the weight percentage range can be from about 0.1 weight percent to about 5 weight percent, or even from about 0.1 weight percent to about 1 weight percent of the total weight of the at least one filler species, the at least one diacid halide, and the at least one diamine.

Contacting the organic medium containing the diacid halide and filler species and the aqueous medium containing the diamine may suitably be performed in several ways. First, the two media may be contacted without stirring such that the species in the two media then react together at the interface of the two media to form a polyamide. This polyamide can then be collected and wound as it forms, as seen in the well-known "nylon rope trick." Alternatively, the two media may be contacted while stirring. Without being bound to any particular theory of operation, the stirring method has the advantages over the "rope trick" method of not requiring a tough film at the interface of the two media, of forming comparatively higher weight polymers, and of improved dispersion of the filler species.

The methods can also include the step of adding an acid after contacting the organic medium and the aqueous medium; the acid serves to terminate the polymerization reaction. Hydrochloric acid is a suitable terminating acid, and other acids suitable for terminating the polymerization reaction will be apparent to those having ordinary skill in the art.

Composite polyamide materials synthesized according to the methods are also included by the invention.

The present invention also provides composite polyamide materials, such materials including at least one polyamide having the molecular formula $[-NH-(CH_2)_5-CO-]_y$; and at least one filler species-polyamide having the molecular formula $[-NH-(CH_2)_5-CO-NH-CO-(CH_2)_n$-filler species-$(CH_2)_n-CO-]$, with at least one peptide bond binding together the at least one polyamide and the at least one filler species-polyamide; suitable filler species are described elsewhere herein.

Typically, n is an integer in the range of from about 1 to about 20, or in the range of from about 2 to about 12, or even in the range of from about 4 to about 9; y is also an integer. As described elsewhere herein, the number n of methylene units in the alkyl chain attached to the filler species may depend on the needs of the user or the applications in which the composite material will be used. As is apparent from the chemical formula of the disclosed composite materials, the disclosed materials incorporate the polyamide Nylon 6, which material is well-characterized and is readily available.

Also disclosed are methods for synthesizing a composite polyamide material. These methods include polymerizing a monomer in the presence of at least one filler species, the at least one filler species comprising at least one alkyl chain bound to the at least one filler species, the at least one alkyl chain terminating with a reactive end group, the monomer forming at least one polymer chain, and the at least one filler species undergoing a condensation reaction with the polymer chain.

Suitable filler species are described elsewhere herein. Suitable monomers include caprolactam, which is considered an especially suitable monomer because it is capable of polymerizing with itself to form Nylon 6, and can be used in a given reaction scheme as both a monomer and as a solvent.

The alkyl chains of the present methods include between about 1 and about 20 carbons, typically as methylene units, as described elsewhere herein. The reactive end groups of the alkyl chains of the present invention can include amide groups. In some embodiments, the reactive end groups can include carboxylic acid groups. The concentration of the alkyl chains bound to the filler species may be varied so as to effect the degree to which a given filler species is bonded into the final composite material.

Filler species are suitably present in the range of from about 0.1 weight percent to about 10 weight percent, relative to the total weight of the monomer and the filler species, but can be present in the range of from about 1 weight percent to about 5 weight percent, relative to the total weight of the monomer and the filler species. Because the relative proportion of the filler species effects, as described elsewhere herein, the mechanical properties of the composite material, the proportion of the filler species may be altered so as to achieve the desired mechanical properties in the final composite material.

EXAMPLES AND ILLUSTRATIVE EMBODIMENTS

Sidewall functionalization of SWNT with long chain carboxylic acid groups was achieved using a modified Birch-type reaction protocol, which was originally developed by Liang et al., *Nano Lett.*, 2004, 4 (7), 1257-1260, to functionalize SWNT with long alkyl chains.

The nanotubes were first functionalized with long chain carboxylic acid groups, $-(CH2)n-COOH(n)$ 4 and 9) by reacting with bromo-carboxylic acid in liquid ammonia in the presence of lithium metal. See Scheme 1 in FIG. 1.

The carboxylic acid groups were then converted into acid chloride groups by reacting with thionyl chloride. For convenience, the acid chloride functionalized nanotubes, fSWNT ((B) in Scheme 1 of FIG. 1) with n=4 and 9 were designated as C4-SWNT and C9-SWNT, respectively, whereas the unfunctionalized nanotubes are designated as SWNT. It is well-known that the polycondensation reaction between hexamethylenediamine and sebacoyl chloride yields nylon 6,10. This polycondensation reaction was performed in the presence of fSWNT (C4-SWNT and C9-SWNT) to synthesize fSWNT/nylon 6,10 composites, see Scheme 2 in FIG. 2.

In the composites featuring C4-SWNT and C9-SWNT, nanotubes were expected to be covalently integrated into nylon chains. There were several variables in this reaction, including: (i) the length of the alkyl chains on the functionalized nanotubes (n), (ii) the ratio of the diacid chloride to the nanotubes, and (iii) the grafting density of the functional groups on the tubes. In this study, we have examined the effect of the first two variables. For a comparative study, the unfunctionalized SWNT were also used in the nylon synthesis and composite fabrication.

Functionalization of SWNT.

SWNT were synthesized by a high-pressure carbon monoxide method (HiPco) at Rice University. Bronikowski, M. J., et al., *J. Vac. Sci. Technol. A*, 2001, 19, 1800. SWNT were purified, Chiang, I. W. et al, *J. Phys. Chem. B.,* 2001, 105, 8297-8301, and have residual metal less than 6 wt % as measured by thermogravimetric analysis (TGA). In order to functionalize the sidewall of SWNT with long chain carboxylic acid groups, 100 mg of SWNT (8.3 mmol of carbon) were taken into a dry 1000 mL three neck round-bottom flask fitted with a dry ice condenser under an atmosphere of argon. Ammonia (600 mL) was then condensed into the flask followed by the addition of lithium metal (Aldrich, 600 mg, 8.5 mmol). The suitable bromocarboxylic acid (5-bromovaleric acid; 1.3 equiv. and 10-bromodecanoic acid; 3 equiv., Aldrich) was then added and the mixture was stirred at −33° C. for 12 h with slow evaporation of ammonia.

The flask was then cooled in an ice bath, and the reaction mixture was quenched by slow addition of ethanol (15 mL) followed by water (20 mL). The reaction mixture was acidified with 10% HCl, and the nanotubes were extracted into hexane and washed several times with water. The hexane layer was then filtered through a 0.2 μm PTFE membrane and washed successively with ethanol and chloroform. The functionalized SWNT were dried overnight in vacuo at 80° C.

To convert the carboxylic acid groups into acid chloride groups, 200 mg of carboxylated SWNT and 30 mL freshly distilled benzene were taken into a 100 mL round-bottom flask fitted with a reflux condenser and a magnetic stir bar. To this mixture were added successively 20 mL of $SOCl_2$ (99.5%, Acros) and 2 mL of DMF. The suspension was stirred at 65° C. for 24 h. The solid was then separated by filtration in a 0.2 μm PTFE membrane filter paper and washed thoroughly with anhydrous tetrahydrofuran (THF). Finally, the solid was vacuum-dried at room temperature for 4 hours.

Figure 3:
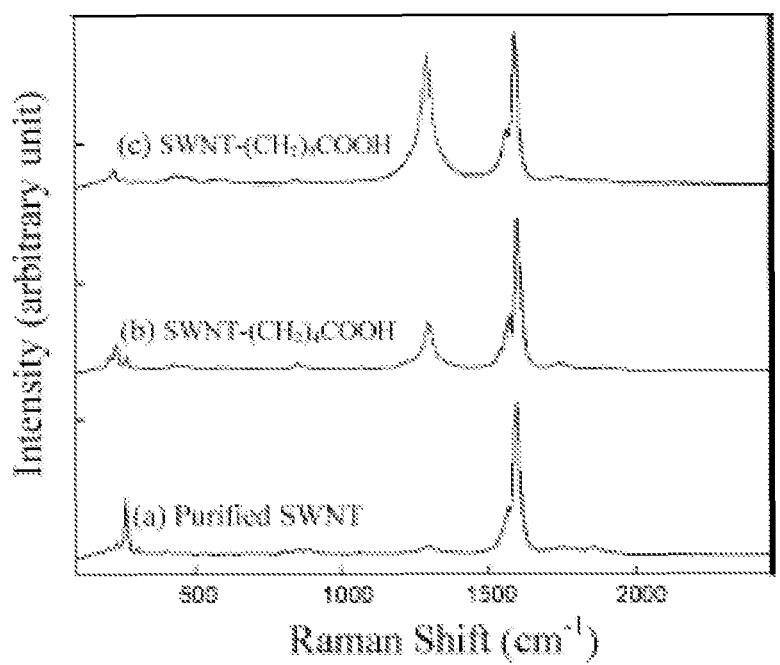
FIG. 3 illustrates Raman spectra of purified and long chain carboxylated SWNT.

Functionalized SWNT were characterized with a Renishaw micro-Raman spectrometer, a Perkin-Elmer 2000 FTIR spectrometer, an X-ray photoelectron spectrometer (XPS), and an SDT 2960 DTA/TGA analyzer (TA instruments). Raman spectra from solid samples of SWNT and the carboxylated SWNT were collected with excitation at 780 nm. The Raman spectrum of pristine SWNT exhibit a tangential mode at 1590 cm-1 (G band) and radial breathing modes at 213, 230, and 265 cm-1, which indicates a diameter distribution of HiPco SWNT, FIG. 3a. After functionalization, the relative intensity of the disorder mode (D band) at 1290 cm-1 is enhanced as groups are attached to the sidewall of the nanotubes, FIGS. 3(b) and 3(c). This was presumed due to the chemically induced disruption of $sp^2$-hybridized carbons in the hexagonal framework of the nanotubes wall. Raman spectroscopy clearly indicated successful covalent functionalization of the SWNT.

FTIR spectra of the alkyl carboxylic acid functionalized tubes showed the CdO stretching vibration at 1710 $cm^{-1}$, which shifted to 1790 $cm^{-1}$ when the carboxylic acid groups were converted to the acid chloride group. The XPS analysis of C4-SWNT and C9-SWNT indicates the chlorine content to be 2-3%, as expected.

Thermogravimetric analysis (TGA) of the functionalized SWNT was used to measure the extent of functionalization, which directly gives information about the carbon/functional group ratio. Samples were degassed at 80° C. and then heated 10° C./min to 800° C. and held there for 30 min. On the basis of the weight loss at 150-500° C. during TGA experiments, there is one alkyl acid chloride group for every 35 and 32 carbon atoms of the nanotube for C4-SWNT and C9-SWNT, respectively.

The length and diameters of the nanotubes were determined from tapping mode atomic force microscopy (AFM) images of the tubes as deposited on silicon wafers from suspensions. Star, A., et al., *Angew. Chem., Int. Ed.,* 2001, 40, 1721-1725.; Islam, M. F., et al., *Nano Lett,* 2003, 269-273.) The average length of the purified HiPco SWNT was 230±95 nm, as determined from the AFM images. After functionalization with long chain carboxylic acid groups, the average length did not change significantly, which indicated that the functionalization protocol used in this study does not adversely affect the nanotube length. The average diameter of the carboxylated SWNT bundle was about 6-7 nm, indicating that SWNT were present in the form of small bundles after functionalization. The slight bundling of SWNT after the functionalization could be attributed to the intermolecular hydrogen bonding of carboxylic acids.

Synthesis of Nylon 6,10 and SWNT/Nylon 6,10 Composites.

The organic phase of the interfacial polycondensation reaction contained the diacid chloride (sebacoyl chloride (99.5%, Acros)) and the suspended nanotubes. The aqueous phase contained the diamine (1,6-hexamethylene diamine (Fluka)) and a base sodium hydroxide to neutralize the byproduct of this reaction, hydrochloric acid. Ideally, the organic phase for this polycondensation method would be immiscible with water and be able to disperse the SWNT and fSWNT. These two criteria were best fulfilled by the solvent dichlorobenzene. The aqueous to organic phase volume ratio and the diamine concentration was optimized to maximize yield.

For the polymerization of neat nylon 6,10, 1.4 g (0.011 mol) of hexamethylene diamine and 0.88 g (0.022 mol) of sodium hydroxide was dissolved in 110 mL water and was placed in a blender (Waring, model 51BL31). A total of 2.63 g (2.36 mL, 0.011 mol) of sebacoyl chloride was dissolved in 190 mL of dichlorobenzene. The blender was run at its highest speed, and the sebacoyl chloride solution was quickly added to the diamine solution. The reaction was very fast, typically running for about 3 minutes. The reaction was terminated by adding a 3% aqueous hydrochloric acid solution to the blender, and the stirring was continued for 1 min more. The polymer was filtered through a 10 μm PTFE membrane (Millipore Mitex), washed repeatedly with water and acetone, and dried at 100° C. under vacuum for 24 h.

To synthesize the nanotube/nylon 6,10 composites, different weight percent nanotubes were dispersed in dichlorobenzene with the aid of bath ultrasonication for 24 h, and then sebacoyl chloride was added to the suspension. The reaction was then carried out using the same procedure and reagent ratios, as described for the nylon 6,10 synthesis. Composites with 0.05, 0.1, 0.5, and 1 wt % loadings of nanotubes were prepared. For C4-SWNT and C9-SWNT, the loading of the nanotubes represent the wt % of the tubes with the functional groups.

The reaction product of the interfacial polymerization of nylon 6,10 was a white powder. The maximum yield (about 80%) was obtained with a 1:2 volume ratio of aqueous to organic phase and with a diamine concentration that was 10% excess of the stoichiometric ratio. FTIR confirmed the chemical structure of the nylon 6,10, showing absorptions for all of the required chemical groups: (Kohan, M. I., Ed.; *Nylon Plastics*; Wiley; New York, 1973.) N—H stretch at 3309 $cm^{-1}$, C—H stretch at 2853-2930 $cm^{-1}$, amide-I at 1638 $cm^{-1}$, and amide-II at 1542 $cm^{-1}$. The nanotube/nylon composites were black powders, with no visible phase separation of nylon 6,10 and nanotubes. The Mark-Houwink equation, $[\bar{\eta}] = K_v (\bar{M}_v)^a$ was used to determine the viscosity averaged molecular weight, $\bar{M}_v$, from intrinsic viscosity measurements (using Kv) $1.35 \times 10^{-4}$ and a=0.96, for nylon 6,10 in m-cresol at 25° C.), (Morgan, P. W.; Kwolck, S. L. *J. Polym. Sci. A* 1963, 1, 1147-1162.) resulting in a $\bar{M}_v \sim 18\,000$ g/mol. The presence of SWNT did not affect the molecular weight of the resulting nylon. The presence of fSWNT slightly reduced the molecular weight of the resulting nylon ($\overline{M}_v$~16 000 g/mol in 1 wt % composites).

Dispersion of Nanotubes in the Composites.

It is known that good dispersion of nanotubes in a polymer matrix provides more uniform stress distribution, Coleman, J. N., et al., *Adv. Mater.*, 2006, 18, 689-706) minimizes the presence of stressconcentration centers, and increases the interfacial area for stress transfer from the polymer matrix to the nanotubes. Haggenmueller et al. showed that interfacial in situ polymerization in a stirred system produces nanocomposites with good nanotube dispersion, provided the nanotubes are well dispersed in the suspension prior to polymerization. Haggenmueller, R. et al., *Polymer,* 2006, 47, 2381-2388.) Pristine SWNT are well dispersed in dichlorobenzene (DCB) with the aid of ultrasonication, Niyogi, S., et al., *J. Phys. Chem. B.,* 2003, 107, 8799-8804.) as are C4-SWNT and C9-SWNT in this study.

Figure 4:
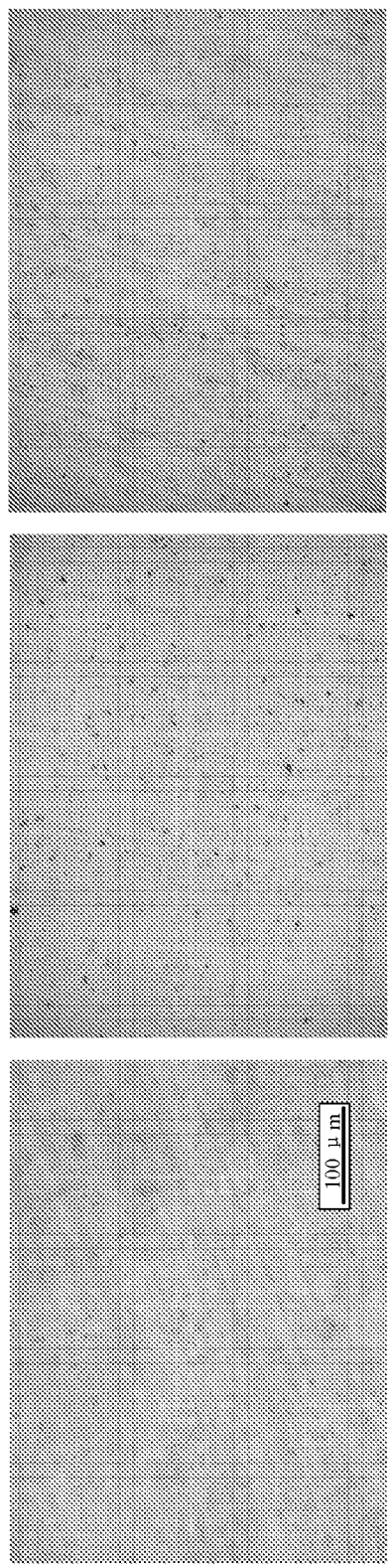
FIG. 4 illustrates optical micrographs of 0.5 wt % nanotube/nylon 6,10 composites for (a) SWNT/nylon, (b) C4-SWNT/nylon, and (c) C9-SWNT/nylon.

To evaluate the dispersion of nanotubes in the composites, films of nanotube/nylon composites (with thickness of about 0.4 mm) were prepared by compression molding in a press at 230° C., followed by quenching on an aluminum bar. The optical micrographs (Olympus, BH-2, reflection mode) of nylon 6,10 composites with 0.5 wt % SWNT, C4-SWNT, or C9-SWNT showed good dispersion of nanotubes on the length scale of optical microscopy, FIG. 4. Therefore, interfacial in situ polycondensation in a stirred system was capable of preserving the good nanotube dispersion of suspensions into the polymer nanocomposites.

Evidence of Covalent Bonding in the Composites.

One of the main objectives of this study was to take advantage of the covalent bonding between the nanotubes and the nylon chains. To investigate whether the acid chloride functionalized nanotubes form covalent bonds with the nylon chains, C9-SWNT were dispersed in dichlorobenzene without the diacid monomer and reacted with an excess of aqueous diamine solution, shown in Scheme 3 in FIG. 5.

Figure 6:
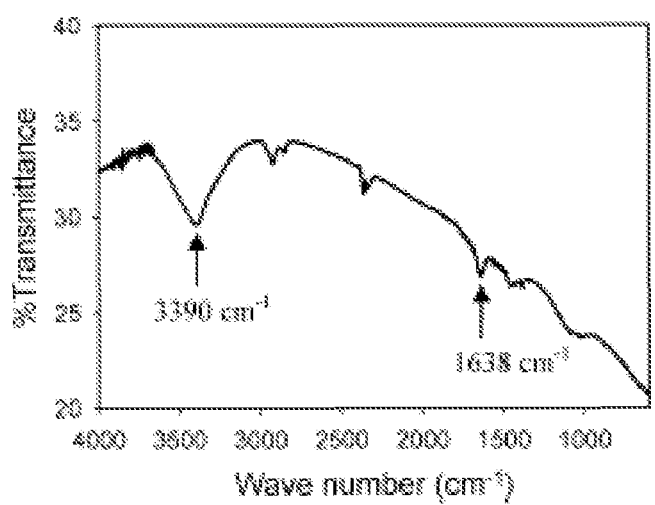
FIG. 6 illustrates a FTIR of the reaction product from reaction Scheme 3.

After the reaction, the excess diamine was washed away, and the reaction product was investigated by FT-IR. The FTIR spectrum shows the amide C=O and NH stretching bands at 1638 and 3390 $cm^{-1}$, respectively, as shown in FIG. 6. The appearance of these two peaks along with the disappearance of the acid chloride carbonyl stretching peak (1790 $cm^{-1}$) confirmed the covalent bond formation between the functionalized SWNT and nylon 6,10 in the composite.

Further evidence of covalent bonding between nanotubes and nylon chains came from the solubility of the composites and fracture surface analysis of the composite films. The nanotubes functionalized with the alkyl acid chloride groups showed very poor dispersion in formic acid, which is a good solvent for nylon 6,10. In contrast, a stable suspension formed when the composite is dissolved in formic acid. The change in solubility or dispersability of nanotubes after the composite synthesis was indirect proof of covalent bonds between the nanotubes and the nylon molecules.

Figure 7:
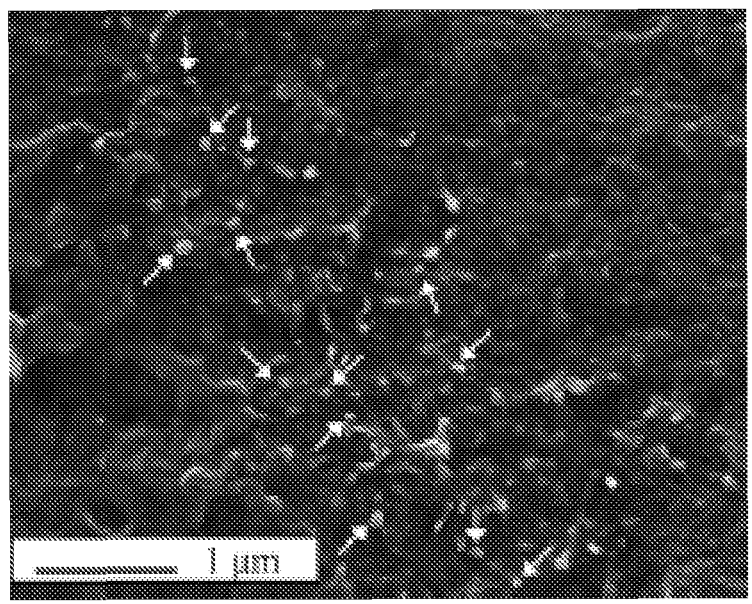
FIG. 7 illustrates a SEM image of the fracture surface of 0.5 wt % C4-SWNT/nylon 6,10 composite film, the arrows in the figure indicating protruding, broken nanotube bundles, and the features in SEM appearing larger than the SWNT bundles.

Composite films were fractured in liquid nitrogen, sputtered with a thin layer of Au/Pd (60:40), and imaged at 15 kV in a scanning electron microscopy (SEM) (JEOL 6300FV). FIG. 7 shows the SEM image of the fracture surface of the composite film containing 0.5 wt % C4-SWNT. In the SEM image, the SWNT bundles appear as bright regions due to their high electrical conductivity. From TEM analysis of a similar bright SEM feature on a fracture surface of SWNT/nylon 6 composites, Gao et al., *J. Am. Chem. Soc.,* 2005, 127 (11), 3847-3854) showed that the bright spots do not represent the actual bundle size of SWNT, but rather they include the SWNT and the polymer that is closely associated with SWNT. The fracture surfaces of the disclosed composite films predominately show broken nanotube bundles, indicating strong interfacial bonding between the nylon and nanotubes in the polymer composites.

Mechanical Properties of Nanotube/Nylon 6,10 Composite Fibers.

Fibers of the composites (80-100 μm diameter) were fabricated by melt extrusion at 240° C. using a DACA SpinLine with a spinneret diameter of 500 μm. The mechanical properties of the composite fibers were evaluated using an Instron 5564 instrument, with a gauge length of 25.4 mm and crosshead speed of 2 mm/min.

Figure 8:
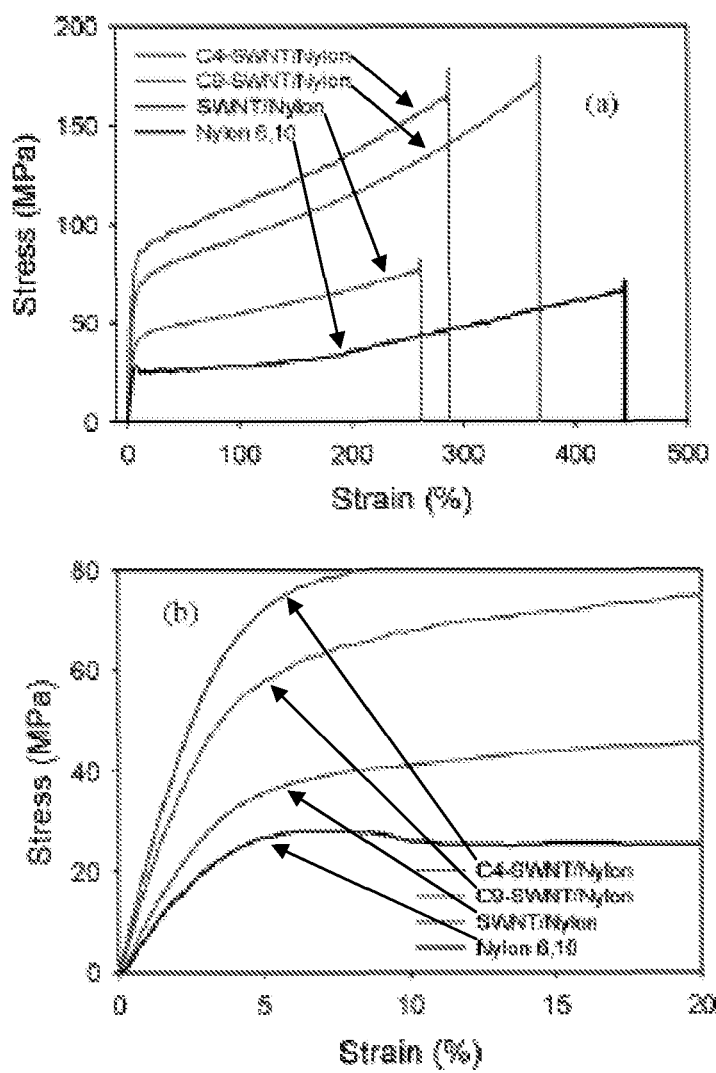
FIG. 8 illustrates (a) stress-strain curves of composite fibers containing 1 wt % SWNT and fSWNT, and (b) the stress-strain curves of (a) replotted to show the differences in Young's modulus.

FIG. 8 shows the stress-strain curves of nylon 6,10 and the composite fibers containing 1 wt % SWNT, C4-SWNT, or C9-SWNT. The Young's modulus, ultimate tensile strength, toughness, and strain at break of nylon 6,10 and the composite fibers with 1 wt % nanotubes are listed in Table 1. The nylon 6,10 fibers have a Young's modulus of 879 MPa and a tensile strength of 67 MPa. All of the SWNT and fSWNT composite fibers with 1 wt % fill had higher Young's modulus and higher tensile strength than pure nylon 6,10 and the improvement is more pronounced with fSWNT. Composite fibers with C4-SWNT exhibit the highest Young's modulus, 2309 MPa, which is 162% higher than that of the nylon 6,10 fibers. This improvement occurred at just 1 wt % C4-SWNT loading in the composite and is coupled with substantial increases in tensile strength (149%) and toughness (106%). The improvements found by incorporating 1 wt % C9-SWNT were even greater for toughness (136%) and strain at break.

TABLE 1

Mechanical Properties of Nylon 6,10 Fibers and 1 wt % Nanotube/nylon 6,10 Composite Fibers

|  | nylon 6,10 | SWNT | C4-SWNT | C9-SWNT |
|---|---|---|---|---|
| Young's modulus (MPa) | 879 ± 65 | 1217 ± 86 | 2309 ± 78 | 1955 ± 73 |
| % change |  | 38 | 162 | 132 |
| tensile strength (MPa) | 67 ± 6 | 79 ± 7 | 168 ± 7 | 177 ± 6 |
| % change |  | 17 | 149 | 163 |
| toughness (MPa) | 177 ± 18 | 152 ± 21 | 365 ± 21 | 417 ± 24 |
| % change |  | −14 | 106 | 136 |
| strain at break (%) | 440 ± 7 | 262 ± 5 | 290 ± 6 | 368 ± 7 |

Improvements in tensile strength and modulus in most of the reported nanotube/polymer composites were coupled with a reduction in strain at break, indicating a decrease in polymer toughness and flexibility. Moniruzzaman, M., et al., *Macromolecules,* 2006, 39, 5195-5205.; Miyagawa, H., et al., *J. Nanosci. Nanotechnol.* 2005, 5 (10), 1593-1615. For example, Gao et al. found that in their melt spun SWNT/nylon 6 composite fibers, the Young's modulus increases from 440 to 575 MPa (31%), the tensile strength increases from 40.9 to 69.1 MPa (69%), whereas the break at strain decreases from 417% to 250% with the incorporation of 1 wt % pristine SWNT in nylon 6. Gao, J., et al., *J. Am. Chem. Soc.,* 2006, 128 (11), 7492-7496. Incorporation of 1 wt % pristine SWNT in nylon 6,10 reduced the break at strain from 440% to 262%, but when C9-SWNT are incorporated into nylon 6,10, the strain at break improves significantly to 368%. The toughness of the composite fibers increased progressively from the composite with pristine SWNT to the fSWNT with increasing alkyl chain length in the functional moiety. Thus, covalent bonding between the nanotube and the nylon chains with flexible spacers at the nanotube/nylon interface improves the Young's modulus, tensile strength, and toughness with minimal reduction in the strain at break. The composite fibers with longer alkyl segment (n=9) at the nanotube/nylon interface showed the highest strain at break and toughness, whereas the fibers with shorter alkyl segment (n=4) at the nanotube/nylon interface exhibited the highest Young's modulus.

Figure 9:
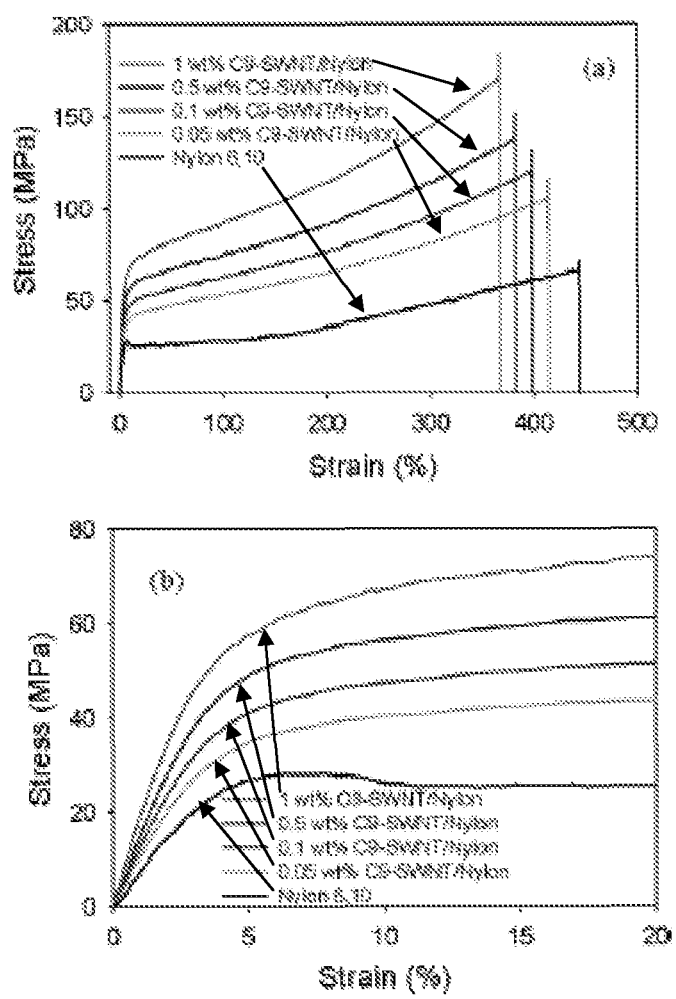
FIG. 9 illustrates (a) stress-strain curves of nylon 6,10 and C9-SWNT/nylon composite fibers with 0-1 wt % C9-SWNT, and (b) the stress-strain curves of (a) replotted to show differences in Young's modulus.

FIG. 9 shows stress-strain curves of C9-SWNT/nylon composite fibers with nanotube loadings, from 0.05 to 1.0 wt %. The Young's modulus, tensile strength, and toughness improve steadily as the C9-SWNT loading increases from 0.05 to 1 wt %, Table 2, suggesting that higher loadings might provide still more property enhancement. Coupled with these improvements in Young's modulus, tensile strength, and toughness, there were only modest reductions in the strain-at-break of the composites. As expected, the strain-at-break decreased gradually with increasing nanotube loadings, but these reductions were significantly less pronounced than commonly reported for SWNT/polymer composites. Moniruzzaman, M., et al., *Macromolecules*, 2006, 39, 5195-5205; Miyagawa, H., et al., *J. Nanosci. Nanotechnol.*, 2005, 5 (10), 1593-1615.

TABLE 2

Mechanical Properties of C9-SWNT/nylon 6,10 Composite Fibers

| | 0 wt % of C9-SWNT | 0.05 wt % of C9-SWNT | 0.1 wt % of C9-SWNT | 0.5 wt % of C9-SWNT | 1 wt % of C9-SWNT |
|---|---|---|---|---|---|
| Young's modulus (MPa) | 879 ± 65 | 1148 ± 82 | 1350 ± 60 | 1620 ± 67 | 1955 ± 73 |
| % change | | 81 | 54 | 84 | 125 |
| tensile strength (MPa) | 67 ± 6 | 105 ± 5 | 124 ± 6 | 145 ± 7 | 177 ± 6 |
| % change | | 56 | 84 | 115 | 163 |
| toughness (MPa) | 177 ± 18 | 284 ± 16 | 311 ± 19 | 350 ± 21 | 417 ± 24 |
| % change | | 60 | 76 | 98 | 136 |
| strain at break (%) | 440 ± 7 | 413 ± 7 | 399 ± 6 | 388 ± 6 | 368 ± 7 |

The question arose as to the origin of the increased toughness of the C9-SWNT/nylon composite fibers relative to SWNT and C4-SWNT composite fibers. Several factors could have contributed to the mechanical properties of nanotube/nylon composites: matrix morphology, filler orientation, filler distribution, and load transfer at the matrix-filler interface. As previously discussed, all of the composites in this study showed similar dispersion of nanotubes, irrespective of the type of the nanotubes. To evaluate the nylon morphology and the nanotube orientation, X-ray scattering was performed in transmission using a multiple-angle X-ray scattering (MAXS) apparatus equipped with a 2-D wire detector. Du, F., et al., *Phys. Rev. B: Condens. Matter*, 2005, 72, 121404/1-121404/4.; Haggenmueller, R., et al., *Macromolecules*, 2006, 39, 2964-2971.)

Figure 10:
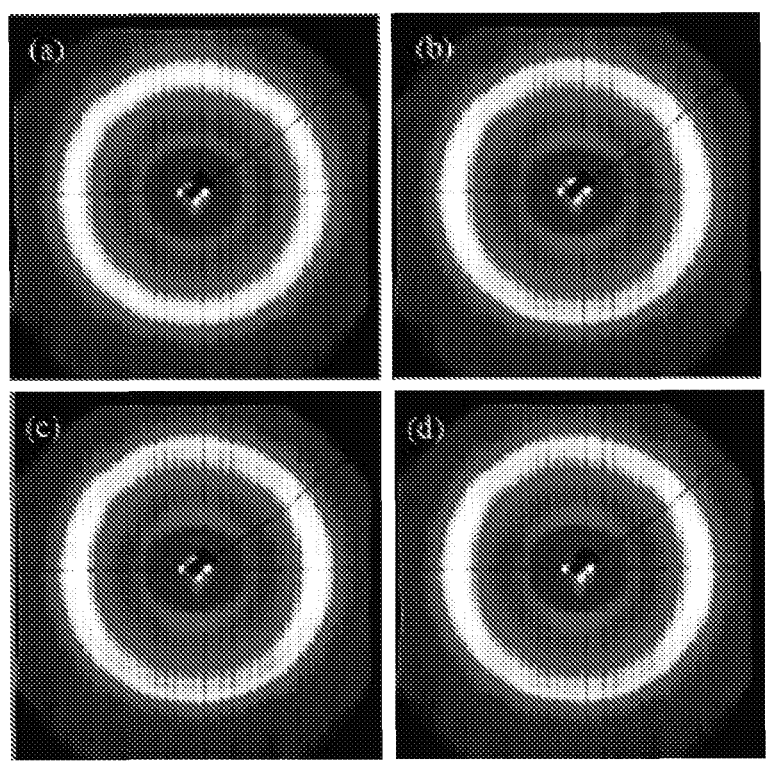
FIG. 10 illustrates 2D wide-angle X-ray scattering patterns from (a) nylon 6,10 fibers, (b) 1 wt % SWNT/nylon fibers, (c) 1 wt % C4-SWNT/nylon fibers, and (d) 1 wt % C9-SWNT/nylon fibers—fiber direction is along the meridian.

The 2D wide-angle X-ray diffraction patterns showed that both the nylon fibers and the nanotube/nylon fibers exhibit a lower angle reflection at 2θ=about 10°, which corresponds to the amide-amide distance, and two higher angle reflections at 2θ=about 20-24°, FIG. 10. Thus, the presence of nanotubes in these nylon 6,10 melt extruded fibers did not significantly alter the nylon crystal structure of the nylon. However, introduction of nanotubes significantly increased the anisotropy of the nylon matrix as evidenced by the low and high angle peaks becoming more intense at the meridional and equatorial positions, respectively. A recent study of SWNT/polyethylene composites indicated that SWNT nucleate and template polymer crystallization. Haggenmueller, R., et al., *Macromol-*

*ecules*, 2006, 39, 2964-2971.) Thus, after the extensional flow aligns the SWNT in the flow direction, the nylon crystallized anisotropically with the nylon chains preferentially along the fiber direction. Azimuthal scans of the low angle peak were fit with Gaussian functions, and the full widths at half-maximum (fwhm) are used to quantify the extent of nylon orientation. The 1 wt % nanotube/nylon 6,10 composite fibers containing SWNT, C4-SWNT, and C9-SWNT have fwhms of 63°, 65°, and 61°, respectively. Thus, the nylon matrix morphology, both with respect to crystalline structure and orientation, was indistinguishable in the disclosed nanotube/nylon composite fibers.

Regarding nanotube orientation, small-angle X-ray scattering was used to detect the form factor scattering of the nanotube bundles at a q range of 0.015-0.075 Å-1.31, 32. The azimuthal scans were fit with Lorenztians and the 1 wt % nanotube/nylon 6,10 composite fibers containing SWNT, C4-SWNT, and C9-SWNT had FWHMs of 65°, 62°, and 67°, respectively, indicating that the composite fibers had comparable nanotube orientation. As the SWNT, C4-SWNT, and C9-SWNT composite fibers possessed indistinguishable matrix morphology, filler orientation, and filler distribution, it was concluded that the improved toughness of the C9-SWNT/nylon composite fibers originated from differences at the nanotube/nylon interface.

The amide groups, —NH—CO—, in nylon chains existed almost exclusively in the trans-conformation, and their H-bonding renders them substantially stiffer than —$CH_2$—$CH_2$-groups. Aharoni, S. M. *n-Hylons: Their synthesis, structure and properties*; Wiley; New York, 1997) In nanotube/nylon nanocomposites, direct covalent bonds between the nanotubes and nylon chains via amide linkages, Zheng, H. et al., *Polymer*, 2006, 47, 113-122.; Gao, J., et al., *J. Am. Chem. Soc.*, 2006, 128 (11), 7492-7496, reduce the flexibility of the nylon matrix. In contrast, covalent bonding between nanotubes and nylon chains via alkyl segments in the C4-SWNT and C9-SWNT composites provides improved chain flexibility at the critical SWNT/matrix interface. These alkyl segments adopted different conformations under an applied stress, and longer alkyl chains can adopt more conformations. Thus, the variety of chain conformations of the interfacial alkyl segment in C9-SWNT/nylon composite fibers permitted larger deformations, so more energy was dissipated before fracture. Although the shorter alkyl segments at the C4-SWNT/nylon interface could have adopted comparatively fewer conformations, the stress transfer from the nylon to the nanotubes appeared to be more efficient, which resulted in a higher modulus.

What is claimed:

1. A composite polyamide material, comprising:
    at least one polyamide having the repeat unit:

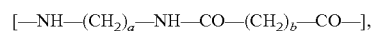
    [—NH—$(CH_2)_a$—NH—CO—$(CH_2)_b$—CO—], a being an integer in the range of from about 4 to about 10, and
    b being an integer in the range of from about 4 to about 10;
    at least one filler species-polyamide having the molecular formula:

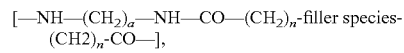
    [—NH—$(CH_2)_a$—NH—CO—$(CH_2)_n$-filler species-$(CH2)_n$-CO—], n being an integer in the range of from 4 to 9; and
    a peptide bond binding together the at least one polyamide and the at least one filler species-polyamide.

2. The composite polyamide material of claim 1, wherein a is equal to 6.

3. The composite polyamide material of claim 1, wherein b is equal to 8.

4. The composite polyamide material of claim 1, wherein the filler species comprises a single-wall carbon nanotube, a double-wall carbon nanotube, a multiwall carbon nanotube, or any combination thereof.

5. The composite polyamide material of claim 1, wherein the filler species comprises a carbon nanofiber, graphite, graphene, a carbon fiber, or any combination thereof.

6. The composite polyamide material of claim 1, wherein the polymer-filler species composite exhibits a Young's modulus in the range of from about 50% to about 500% of the Young's modulus of the at least one polyamide.

7. The composite polyamide material of claim 1, wherein the composite polyamide material exhibits a Young's modulus in the range of from about 100% to about 400% the Young's modulus of the at least one polyamide.

8. The composite polyamide material of claim 1, wherein the composite polyamide material exhibits a Young's modulus in the range of from about 150% to about 250% the Young's modulus of the at least one polyamide.

9. The composite polyamide material of claim 1, wherein the composite polyamide material exhibits a tensile strength in the range of from about 50% to about 500% of the tensile strength of the at least one polyamide.

10. The composite polyamide material of claim 1, wherein the composite polyamide material exhibits a tensile strength in the range of from about 100% to about 400% of the tensile strength of the at least one polyamide.

11. The composite polyamide material of claim 1, wherein the composite polyamide material exhibits a tensile strength in the range of from about 150% to about 250% of the tensile strength of the at least one polyamide.

12. The composite polyamide material of claim 1, wherein the composite polyamide material exhibits a toughness in the range of from about 50% to about 500% of the toughness of the at least one polyamide.

13. The composite polyamide material of claim 1, wherein the composite polyamide material exhibits a toughness in the range of from about 150% to about 400% of the toughness of the at least one polyamide.

14. The composite polyamide material of claim 1, wherein the composite polyamide material exhibits a toughness in the range of from about 200% to about 300% of the toughness of the at least one polyamide.

15. A method for synthesizing a composite polyamide material according to claim 1, comprising:
dispersing at least one filler species and at least one diacid halide into an organic medium,
the at least one filler species comprising at least one alkyl chain bound to the at least one filler species, said alkyl chain comprising 4-9 carbon atoms and
the at least one alkyl chain terminating with an acid chloride;
dispersing at least one diamine in an aqueous medium; and
contacting the organic medium and the aqueous medium so as to give rise to at least one diamine undergoing condensation reactions with at least one acid chloride group of at least one filler species and with at least one diacid halide.

16. The method of claim 15, wherein the at least one filler species comprises a single-wall carbon nanotube, a double-wall carbon nanotube, a multi-wall carbon nanotube, a carbon nanofiber, graphite, graphene, a carbon fiber, or any combination thereof.

17. The method of claim 15, wherein the diacid halide comprises sebacoyl chloride.

18. The method of claim 15, wherein the organic medium essentially homogeneously disperses the at least one functionalized single-wall carbon nanotube and the at least one diacid halide.

19. The method of claim 15, wherein the organic medium comprises dichlorobenzene.

20. The method of claim 15, wherein the organic medium comprises toluene.

21. The method of claim 15, wherein the at least one diamine comprises 1,6 hexamethylene diamine.

22. The method of claim 15, wherein the aqueous medium comprises water.

23. The method of claim 22, wherein the aqueous medium further comprises a base.

24. The method of claim 15, wherein the at least one diacid halide and the at least one diamine are present in approximately equimolar amounts.

25. The method of claim 15, wherein the at least one diamine is present in an about 10% molar excess over the at least one diacid halide.

26. The method of claim 15, wherein the at least one filler species is present in the range of from about 0.1 weight percent of the total weight of the at least one filler species, the at least one diacid halide, and the at least one diamine to about 10 weight percent of the total weight of the at least one filler species, the at least one diacid halide, and the at least one diamine.

27. The method of claim 15, wherein the at least one filler species is present in the range of from about 0.1 weight percent of the total weight of the at least one filler species, the at least one diacid halide, and the at least one diamine to about 5 weight percent of the total weight of the at least one filler species, the at least one diacid halide, and the at least one diamine.

28. The method of claim 15, wherein the at least one filler species is present in the range of from about 0.1 weight percent of the total weight of the at least one filler species, the at least one diacid halide, and the at least one diamine to about 1 weight percent of the total weight of the at least one filler species, the at least one diacid halide, and the at least one diamine.

29. The method of claim 15, further comprising the step of adding an acid after contacting the organic medium and the aqueous medium.

* * * * *

UNITED STATES PATENT AND TRADEMARK OFFICE
CERTIFICATE OF CORRECTION

PATENT NO. : 8,816,042 B2  
APPLICATION NO. : 12/665121  
DATED : August 26, 2014  
INVENTOR(S) : Mohammad Moniruzzaman et al.

It is certified that error appears in the above-identified patent and that said Letters Patent is hereby corrected as shown below:

In the Specification

Column 1,
Lines 16-20, delete "The United States government may have certain rights in this invention. This invention was funded by the National Science Foundation (DMRMRSEC 05-20020, CHE-0450085), and the Office of Naval Research (DURINT N00014-00-1-0720)." and insert -- This invention was made with government support under grant numbers DMR 0520020 and CHE 0450085 awarded by the National Science Foundation and grant number N00014-00-1-0720 awarded by the Office of Naval Research. The government has certain rights in the invention. --.

Signed and Sealed this  
Fifteenth Day of December, 2015

Michelle K. Lee  
*Director of the United States Patent and Trademark Office*